J. W. Wattles.
Ring Spinning Mach.
No. 3,165. Reissued Oct. 20, 1868.
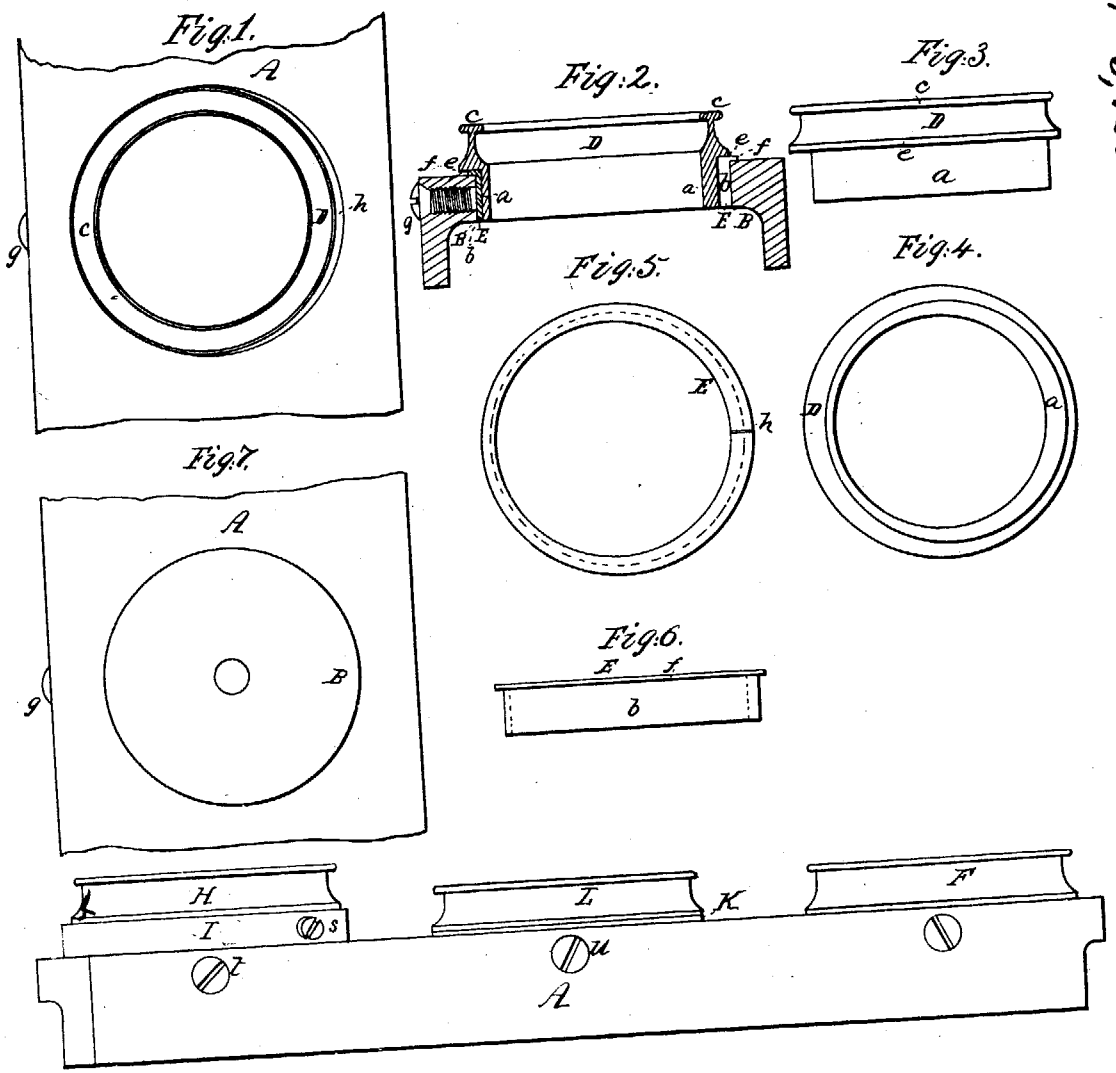
Witnesses
S. N. Piper
H. P. Hale Jr.
Inventor
Jos. W. Wattles.
by his attorney
N. C. Eddy United States Patent Office.

JOSEPH W. WATTLES, OF CANTON, MASSACHUSETTS.

*Letters Patent No.* 75,610, *dated March* 17, 1868; *reissue No.* 3,165. *dated October* 20, 1868.

IMPROVEMENT IN RING FOR RING AND TRAVELLER SPINNING-MACHINE.

The Schedule referred to in these Letters Patent and making part of the same.

*To all persons to whom these presents may come:*

Be it known that I, JOSEPH W. WATTLES, of Canton, in the county of Norfolk, and State of Massachusetts, have made a new and useful invention, having reference to the Ring and Traveller Spinning-Frame; and I do hereby declare the same to be fully described in the following specification, and represented in the accompanying drawings, of which—

Figure 1 is a top view, and

Figure 2 a transverse section of a ring-rail and ring with my invention applied thereto.

Figure 3 is a side elevation, and

Figure 4 an under-side view of the ring and its shank.

Figure 5 is a top view, and

Figure 6 a side view of the ring-receiver.

Figure 7 is a top view of the ring-rail and spindle, without the ring and its receiver.

The purpose of my present invention or improvement is to enable the ring and its receiver to be held together, and in the ring-rail, by the pressure of a single screw.

On May 24, 1864, Letters Patent of the United States, numbered 42,829, were granted to John Birkenhead for a mode of adjusting rings and ring-rails in "ring and traveller spinning-frames." In carrying out this invention, the said Birkenhead applied to the ring an eccentric cylindrical shank, which, when placed in the socket of the ring-rail and turned around, would bring the ring concentric with the spindle, the latter being out of its normal position, owing to wear of its bearings, or other causes well understood.

The difficulty with the invention of Birkenhead is, that it is inapplicable to the ring-rail when the spindle is in its normal position, or concentric with the socket of the rail. It also requires the eccentricity of the ring-shank to correspond with the eccentricity of the spindle. Thus every vertical deflection of the spindle will require a corresponding or new eccentric ring. This renders Birkenhead's invention of very limited use.

I have combined with the eccentric ring of Birkenhead what I term a receiver, or another ring, made with a shank to fit the rail-socket, and having a bore eccentric with the cylindrical outer surface of such shank. This receiver is to be inserted within the rail-socket, and is to support the ring, provided with an eccentric-shank to fit into the bore of the receiver.

The receiver may be applied to the rail-socket when concentric with the spindle, and however the spindle may afterward become eccentric to the ring and the socket, by revolving the receiver in the socket, and the ring in the receiver, we shall be able to bring or adjust the ring so as to be concentric with the spindle.

The ring-receiver I form as a thin ring, easily sprung diametrically by pressure of the set-screw used to hold it in place in the socket of the ring-rail. In order to have the receiver readily compressible on the shank of the ring, I split the receiver through its circumference, by sawing through the same, or removing therefrom a small portion, so that the ring may not be an entire circle.

In the drawings, A denotes the ring-rail, B its socket; D, the ring, and *a* the shank thereof; E, the receiver, and *b* its shank. The outer cylindrical surface of the shank of the ring is eccentric with respect to the race-way *c* and the bore of the ring. The bore of the receiver is cylindrical, and eccentric with respect to the outer surface of the shank of such receiver, the whole being as represented in the drawings. The supporting-flange of the ring is shown at *e*, and that of the receiver is exhibited at *f*. The screw for holding the receiver and the ring together, and within the socket of the ring-rail, is seen at *g*, as screwed into the ring-rail, and radially against the outer surface of the receiver. The cross-cut or opening of the receiver is shown at *h*, it being what is usually termed a "split ring."

When, for the purpose of fastening the receiver, a screw is employed to go through the latter, the receiver has to be clamped about one-fourth of an inch above the ring-rail, the same being as shown in Figure 8, which is a side view of a ring-rail not only having such a receiver and its ring applied to it, but also showing a receiver and ring as made and applied in accordance with my improvement. It also shows the common ring without a receiver, and held in place on the rail by a single screw. In this figure, A is the ring-rail; F, the common ring; H, the ring with the elevated receiver I, fastened together by a clamp-screw, *s*, another screw, *t*, being employed to hold the receiver in the rail-socket.

My improved receiver and ring are shown in fig. 8, at K and L, as held together and on the rail by a single screw, *u*.

By examination of fig. 8, it will be seen that the top surface of my ring L is no higher above the rail than that of the common ring F, while that of the elevated ring H is very much higher. This extra elevation of the ring above the ring-rail causes the yarn to be laid out of place, or too high on the spindle, especially when the ring H and its receiver I are substituted for the old or common ring, or that of Birkenhead; but with my improvement, as the ring L and receiver K will stand no higher than the common ring above the rail, there will be no such improper laying of the yarn on the spindle.

I do not herein claim the said invention of the said Birkenhead, nor do I intend herein to claim the combination of the annulus or receiver E, having an eccentric bore, as described, with the ring D, provided with an eccentric shank, as set forth.

I am aware that it is not new to apply to the journal of a shaft a split tubular bearing, to be compressed upon the shaft by means of a screw, such being as shown in the United States Patents Nos. 50,469 and 60,155. Therefore I make no claim thereto.

Nor do I claim an eccentric ring and an eccentric receiver, made, arranged, and held together and to the rail by two screws, in manner as represented in the United States Patent No. 68,185.

I claim the ring-receiver, constructed substantially as described, that is to say, not only with a shank to fit the rail-socket, and with a bore eccentric with the cylindrical outer surface of such shank, as described, but also so as to be capable of being sprung or contracted upon the shank of the ring, by the screw inserted in the rail, and employed to confine the receiver in the socket of the rail, as set forth.

I also claim the combination and arrangement of the single screw with the ring-rail, and with the clamping-receiver and ring, constructed as hereinbefore described, the whole being for the purpose set forth.

JOSEPH W. WATTLES.

Witnesses:
R. H. EDDY,
J. R. SNOW.